United States Patent

Rousseau et al.

[15] 3,683,522
[45] Aug. 15, 1972

[54] FRUSTOCONICAL ROTARY CUTTER FOR DIGGING TRENCHES

[72] Inventors: Louis Rousseau; Joseph Rousseau, both of 8, Avenue Auguste Wissel, Neuville sur Saone (Rhone), France

[22] Filed: April 13, 1970

[21] Appl. No.: 27,882

Related U.S. Application Data

[62] Division of Ser. No. 645,184, June 12, 1967, Pat. No. 3,574,989.

[52] U.S. Cl. .................. 37/91, 37/189, 172/741, 299/87
[51] Int. Cl. ................................................. E02f 5/08
[58] Field of Search ............... 299/87; 37/91–93, 37/189; 172/305, 273, 741

[56] References Cited

UNITED STATES PATENTS

| | | | |
|---|---|---|---|
| 2,705,379 | 4/1955 | Fruhling | 37/189 X |
| 2,882,978 | 4/1959 | Smith et al. | 172/305 X |
| 2,430,048 | 11/1947 | Engel et al. | 37/81 |
| 2,348,796 | 5/1944 | Ferwerda et al. | 172/305 |
| 2,942,360 | 6/1960 | Hawkins et al. | 37/91 |
| 3,034,275 | 5/1962 | Happe et al. | 37/189 UX |
| 2,969,601 | 1/1961 | McMaster | 37/91 X |
| 1,762,441 | 6/1930 | Johnson | 37/189 X |
| 2,885,800 | 5/1959 | Hawkins | 37/91 |
| 2,798,315 | 7/1957 | Gifford | 172/305 |

FOREIGN PATENTS OR APPLICATIONS

| | | | |
|---|---|---|---|
| 162 | 1/1868 | Great Britain | 37/189 |
| 248,342 | 11/1962 | Australia | 37/92 |

*Primary Examiner*—Robert E. Pulfrey
*Assistant Examiner*—Clifford D. Crowder
*Attorney*—Tab T. Thein

[57] ABSTRACT

Rotor-type cutter attachable to a tractor and the like vehicle, for carrying at the end of a supporting arm a tool for digging trenches. The tool is preferably in the form of a rotary cutter. Mechanisms are provided for adjusting the position of the tool relative to the vehicle and the soil. The supporting arm has a telescoping system actuated by hydraulic cylinders, for moving the tool toward and away from the vehicle. A gear system is provided for imparting rotational movement to the tool with respect to the supporting arm. Preferably, a linkage is secured between the vehicle and a portion of the arm, intermediate the vehicle and the tool, and hydraulic cylinders for adjusting the angular position of the linkage and thereby raising and lowering the tool together with the arm.

3 Claims, 16 Drawing Figures

Patented Aug. 15, 1972

INVENTORS:
Louis Rousseau
et al
By
Agent

Patented Aug. 15, 1972
3,683,522
7 Sheets-Sheet 2
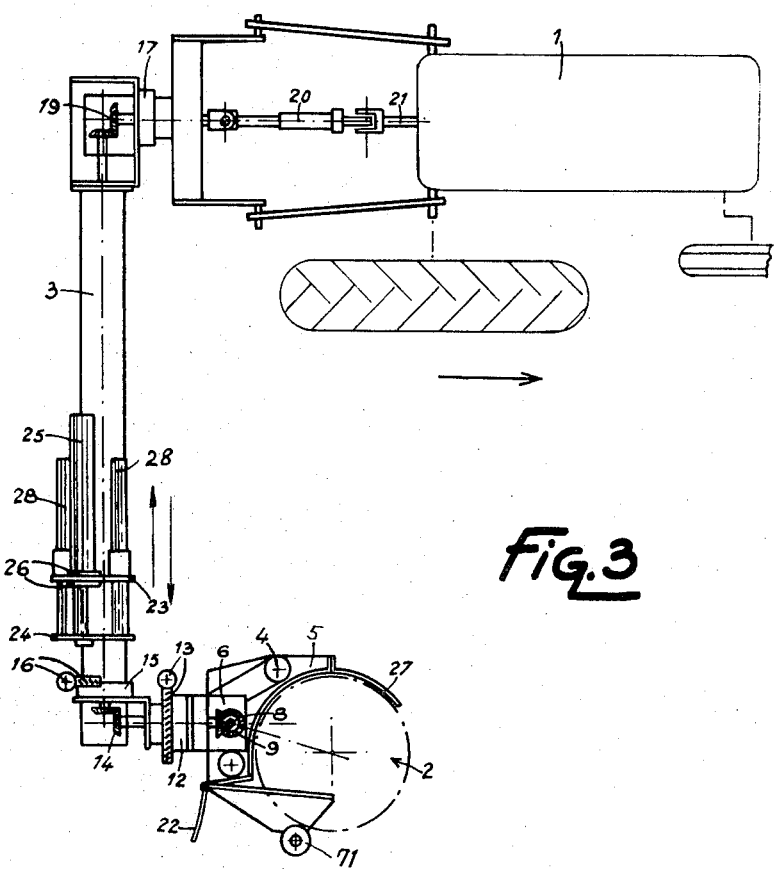
Fig.3
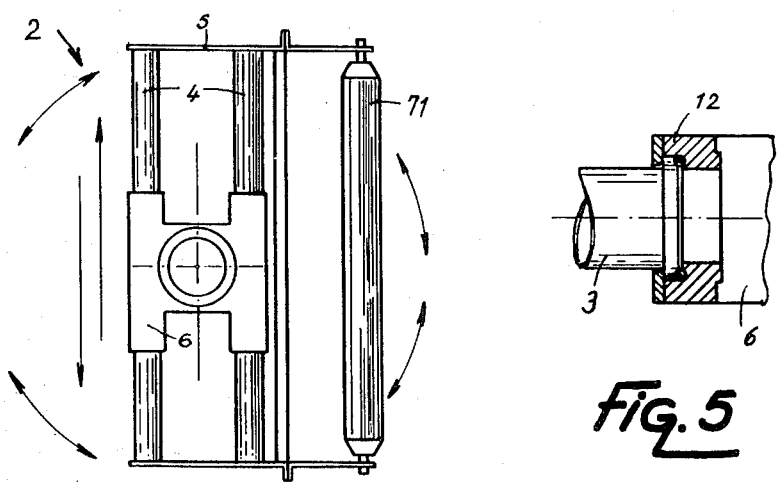
Fig.4
Fig.5
INVENTORS:
Louis Rousseau
et al
By [signature]
Agent INVENTORS
Louis Rousseau et al.
By [signature] Agent INVENTORS
Louis Rousseau
et al.

Patented Aug. 15, 1972

INVENTORS
Louis Rousseau
et al

By *Tab Hein.*
Agent

FRUSTOCONICAL ROTARY CUTTER FOR DIGGING TRENCHES

This application is a division of application Ser. No. 645,184 filed June 12, 1967, now U.S. Pat. No. 3,574,989.

The present invention relates to improvements in rotor-type or rotary cutters, to be used in conjunction with a tractor, and equipped with a supporting or carrying arm which acts as a tool holder for rotary grinders, grinding units, cutting units and the like. The supporting arm allows the afore-mentioned units to be raised and lowered with respect to the soil, advanced and retracted with respect to the trailing tractor, angularly adjusted and also rotated to any position and angle which suits the particular job to be performed.

In one arrangement according to the just mentioned earlier patent, a rotor-type grinder is fitted, at the end of the supporting arm, with a tool in the form of a rotary grinder for chopping parasitic vegetation and the like, including a shaft provided with articulated knives or cutters which form a grinding unit and which may have one or more rotors capable of carrying a loading hood for receiving the crushed or ground products. Full details of the objects and features of this embodiment are set forth in the earlier patent.

In a preferred, exemplary arrangement according to the invention, the rotor-type cutter is fitted, at the end of the supporting arm, with a tool in the form of a novel rotary cutter designed to dig into and excavate trenches. The improvements constituted by this embodiment of the invention are characterized by:

1. Provision of a two-speed transmission with reversal of rotation.
2. Pivotability around the vertical axis of the supporting arm head of the combined cutter unit, speed reducer and inverter assembly, in order that the cutter can align as necessary to any position in the clearing of trenches even when bordered by a wall, hedge or slope.
3. Working of the rotary cutter in a trailing arrangement, so as to reduce any tendency to penetration.
4. Execution of cutter work over a wide area and with a considerable output.
5. Feasibility of working a tough or pebbly soil.
6. Use of a depth limiter, mounted directly behind the cutter blades or knives, thus assuring a level-grade cut and smoothing out the floor of the trench.

According to one of the important features of the invention, the rotor-type grinder or cutter comprises a supporting arm, a rotary tool releasably attachable to the outer end of the arm, drive means for rotating the tool from a power drive of the vehicle, at least one gear means forming part of the drive means, and means for adjusting the position of the tool relative to the vehicle and the soil.

The various objects, features and advantages of the present invention will become more apparent from the following description of preferred exemplary embodiments of the rotary grinders and cutters, when considered in conjunction with the accompanying drawings, wherein FIG. 1 is a rear view of the rotor-type grinder according to the earlier patent, presented here for the sake of information only, and shown, in vertical position, adapted to tractor use through the intermediary of a supporting arm, and fitted with a rotary grinder for chopping parasitic vegetation;

FIG. 3 is a plan view, from above, of the grinder as shown in FIGS. 1 and 2;

FIG. 4 is a rear view of a grinding unit forming part of the grinder of FIGS. 1 to 3;

FIG. 5 is a partial view of an H-shaped articulation of the supporting arm;

Figure 1:
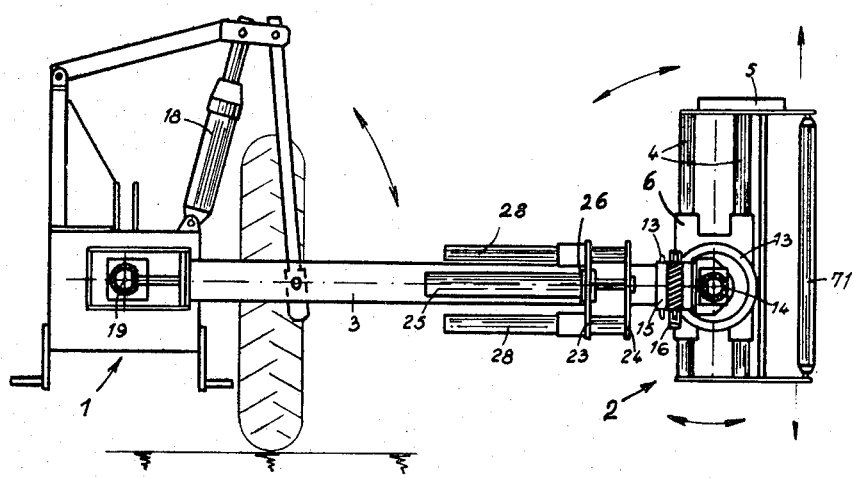
Figure 2:
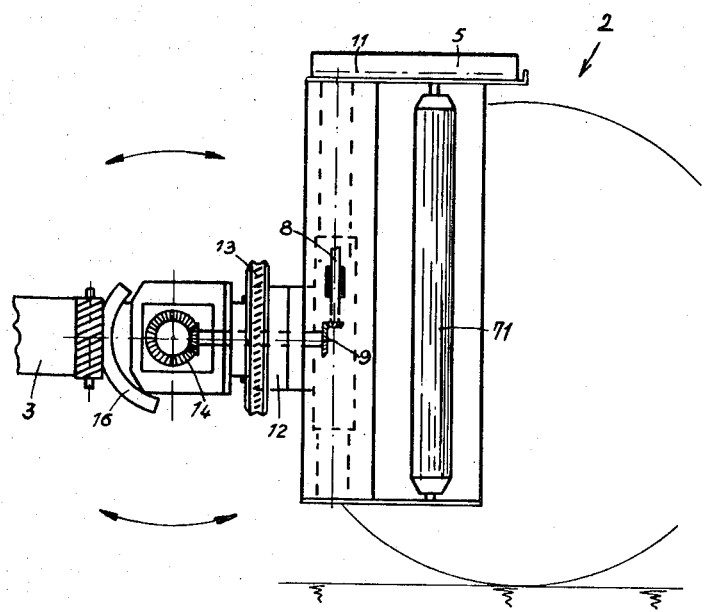
FIG. 2 is a side view of a portion of the grinder of FIG. 1.

In the following, the rotor-type grinder of the above-mentioned earlier patent will be described, for the sake of information and completeness of disclosure, although not claimed herein, with reference to FIGS. 1 to 9, also incorporating structural elements which are common to both embodiments (the rotor-type cutter forming the subject matter of FIGS. 10 to 16).

In the somewhat schematic drawings, and more particularly with reference to FIGS. 1 to 4, numeral 1 designates a tractor, 2 a grinding unit as used for the machine, and 3 a carrying or supporting arm or tool holder mounted pivotally at the rear of tractor 1, forming part of both the grinder and the cutter.

The rotor-type grinder comprises, in the grinding unit 2, two tubes 4 which are connected to a casing or cover 5 in the position as defined in FIG. 4. Along these two tubes 4 there slides an H-shaped or twin member 6 in which there is lodged a conical gearing 9 that transmits its motion to a rotary grinder or rotor 7 via a hexagonal rod 8 (also visible in FIG. 9). The rotor shaft is fitted with a chain pinion 10 (see FIG. 7) which transmits the movement to the grinder 7 by a chain 11.

Arm 3 serves as a carrier or holding member between grinding unit 2 and the engine on tractor 1. The twin member 6 of the machine is connected to arm 3 through the intermediary of an articulation by means of a ball bearing 12 (detail shown in FIG. 5), this arrangement permitting the attachment of all adaptable tools (such as, for example, the rotary grinder 7 of the rotor-type grinder according to applicants' earlier patent, or a rotary cutter 44 of the inventive rotor-type cutter, to be described in full detail with reference to FIGS. 10 to 16), and the positioning, at all angles, of these tools or of the grinding unit 2.

Mechanical tilting is provided in the grinder by a gear and tangential screw system 13 capable of being actuated either by a crank or a hydraulic motor (not shown).

Thus, the line or path of motive force is angled by 90°, by means of an angular shaft, with a second conical gearing 14. This mechanism is again linked to a ball bearing 15 (second articulation) whose positioning is likewise assured by a gear and tangential screw system 16, similar to elements 12, 13 previously described.

The transmission passes thus to tube 3 serving as a carrying arm and including a telescoping system 23, 24 sliding on three tubes 28 whose push-and-pull motions are executed through the aid of a double-action hydraulic unit 25, 26. The arm 3 is articulated, at its point of fixation on tractor 1, likewise by a ball bearing 17, permitting a tool attached to the head of arm 3 during use to swing or pivot in pendulum fashion, the sweep or range being in proportion to the length of arm 3. A hydraulic unit 18 (see FIGS. 1 and 10) provides this movement. It should be noted that unit 18 is being omitted from FIGS. 3 and 11 for the sake of clarity. A third conical gearing 19, set in the tractor axis, permits connection of a cardan joint 20 with a power outlet 21 of the tractor.

It will be noted from the foregoing that the structural elements common to the two embodiments are those numbered 1, 3, 12 to 21, 23 to 26 and 28.

Figure 9:
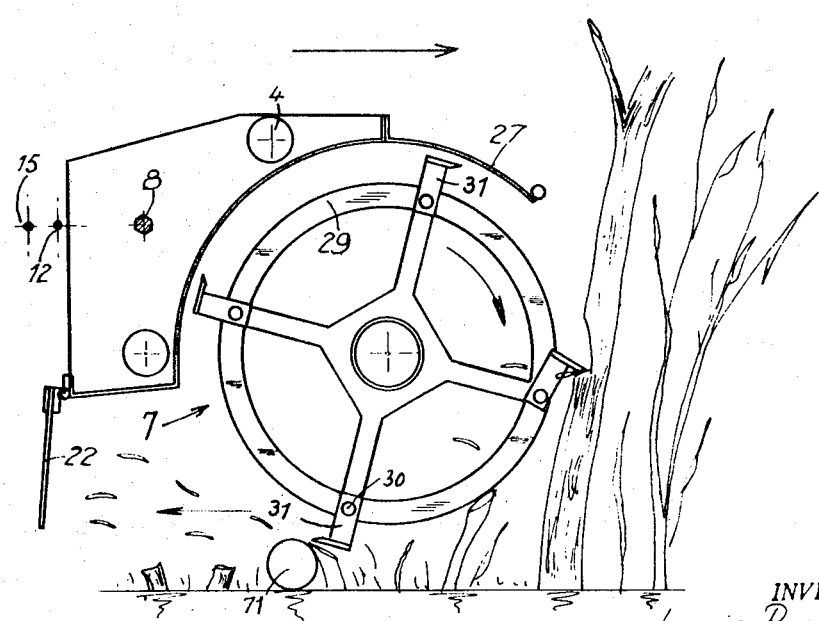
FIG. 9 is a cross-sectional transverse view of the grinder of FIGS. 1 to 3, here shown in a position parallel to the soil in an example of destructing parasitic vegetation.

The grinding unit 2 of the rotor-type grinder has provided thereon a guard 22 and an arcuate shield 27, as shown in FIGS. 3 and 9.

Figure 6:
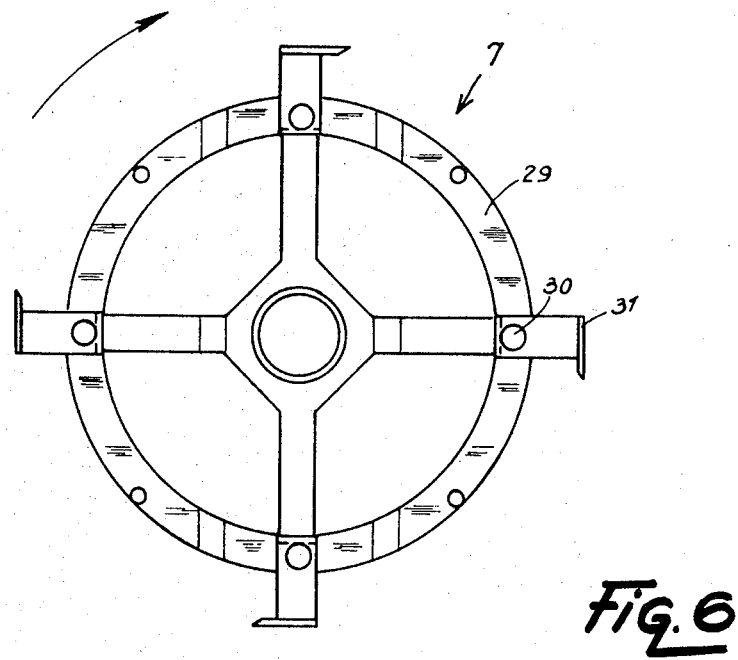
FIG. 6 is an end view of the rotary grinder usable with the apparatus of FIGS. 1 to 3.
Figure 7:
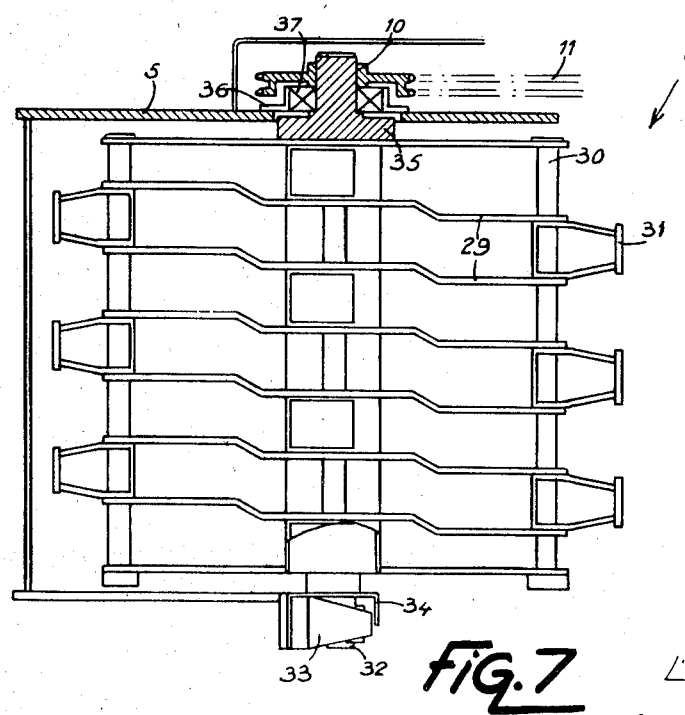
FIG. 7 is a partial plan view of the grinder shown in FIG. 6.
Figure 8:
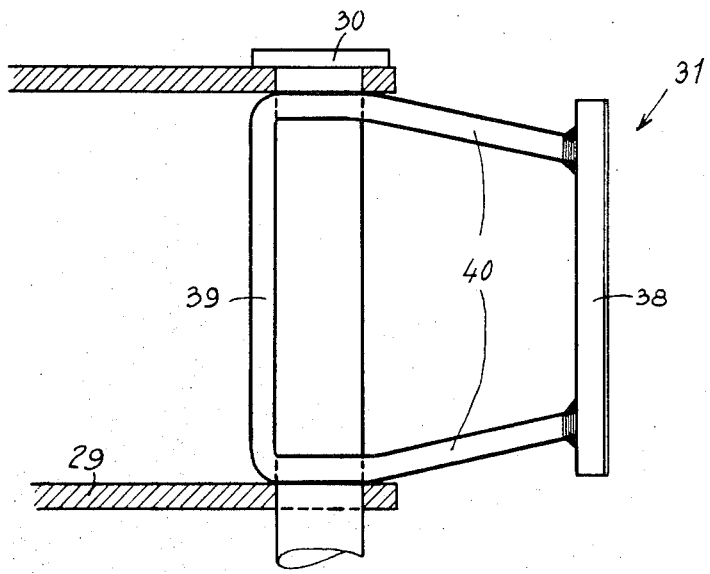
FIG. 8 is an enlarged sectional detail view of a knife and its holding assembly.

FIGS. 6 to 8 show the rotary grinder 7 and its novel system for assuring limit-of-stroke control. This grinder includes at one end a ferrule 32 enclosing a bearing 33 and a shield 34, while at the other end a cheek 35 permits easy attachment or detachment of grinder 7 on the casing 5. The connection between these parts is assured by a screw-fastened ferrule 36 enclosing a bearing 37.

The grinder 7 is provided at regular intervals along its surface perimeter with limiting discs 29 permitting the use of very short knives 31 which are afforded protection by these discs in circumstances of undue stress or violent shock caused by a sudden obstacle to the bladed action of the cutting cycle.

Once passed the obstacle, the centrifugal force of the grinder rotation returns the knives to their normal work position (see FIG. 9). To this end, the knives 31 are loosely mounted on shafts 30, as shown in FIG. 8.

These discs 29 are skewed over a portion of their circumference, as shown in FIG. 7, forming several substantially parallel sections in different planes, so as to permit total coverage of the cut surface on account of a substantially continuous cutting line produced by the rotating knives. The knives 31 that arm the grinder are designed to sever even thick branches or limbs in their chopping action, their blade edges 38 cleaving through from their setting perpendicular to the radius.

Each knife 31, FIG. 8, has a sharp edge or blade 38 of, for example, manganese silicon steel. The sole 39 is of mild steel. These members 38, 39 are linked by two flat irons 40, also of mild steel composition, which are almost parallel to each other but slightly inwardly bent, as shown, to permit cut material to pass between the knives, and within each knife.

These pieces are joined together, for example, by electric soldering, and are subjected to thermal treatment designed to temper the blades 38.

In FIG. 9 can be seen a roller 71 that insures separation or spacing of the grinding unit above ground such that the knives 31 of the grinder 7 do not make contact with the soil. For the work represented in FIG. 9, this same roller 71 serves as a counter-edge to ensure a more efficient fragmentation of the crushed product, as well as to balance the cutting-stroke action.

It will be noted from the foregoing that the structural elements specific to the rotor-type grinder are those numbered 2, 4 to 11, 22, 27, 29 to 40 and 71.

From here on, the preferred, exemplary embodiment of the inventive rotor-type cutter will be described, with reference to FIGS. 10 to 16; the common structural elements will not be described again.

Figure 10:
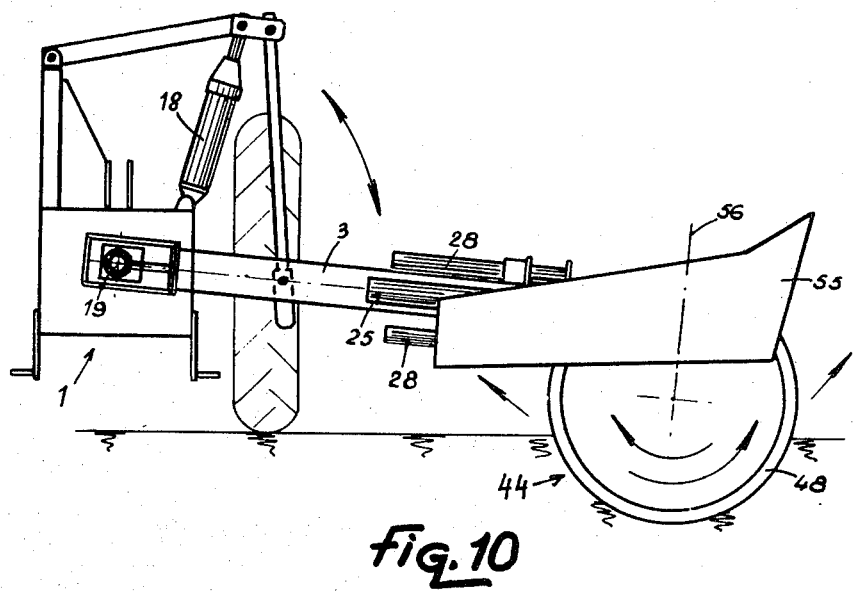
FIG. 10 is a rear view of a rotor-type cutter according to the invention, fitted with a rotary tool for digging trenches.

The cutter illustrates the applicability of the supporting arm 3 as a multiple-use tool holder. As a matter of example, the afore-mentioned rotary cutter 44 is attached to the end of the arm (FIGS. 10 and 11).

Figure 11:
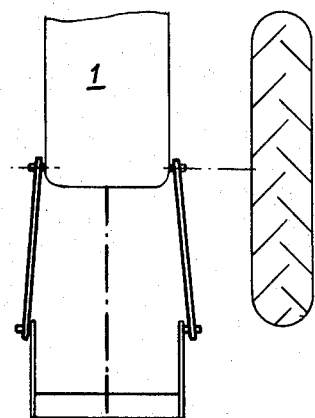
FIG. 11 is a plan view, from above, of the cutter as shown in FIG. 10, and similar to the illustration of FIG. 3.

The rotor-type cutter illustrated in these figures is intended for use in excavating and clearing out depressions, this type of work requiring an output with respect to a generally horizontal plane (FIG. 10), representing the route of the tractor as indicated by the directional arrow (FIG. 11).

The pivoting of a transmission or gear casing 57 of the cutter 44 around a vertical axis 56 of the head of the supporting arm 3 is attainable through adjustability at all angles of said gear casing, for excavating and clearing trenches of various sections, ranging from the thickness or size of the cutter to its maximum diameter (FIG. 11). The arrows indicate the sense of travel of the cutter, drawn by the tractor, and show the entire unit in motion with the rotary cutter trailing, i.e., behind the tractor.

The cutter 44 is joined to gear casing 57 (FIG 12) via a cheek shaft 58 carrying a pinion 59 which engages another pinion 60, the latter receiving the motion of a conical coupling gear 61. This conical gear is backed by a two-speed reduction gear train 50 which itself is the recipient of motion from a mechanical inverter or speed reverser 49. The outlet of this inverter is coupled by a sleeve 51 to level gear 14.

It will be understood by those skilled in the art that the respectively intermeshing gear pairs of the transmission 57 and/or their actuating organs are not described here in detail but will be understood without difficulty. Depending on the positioning, in axial direction, of the unnumbered shaft carrying four gears, and selectively engageable with appropriate smaller or larger gears on the aligned shafts of the speed reverser 49 and the reduction gear 50, respectively, will produce different rotational speeds, or even a reversal of the direction of rotation, of the output shaft 58 to which the rotary cutter 44 is secured. The body of transmission or gear casing 57 is assembled with the head of supporting arm 3 via ball bearing 12.

The cutter 44 (FIGS. 13 and 14) consists of a cone 45 and a sole 62. On the cone, detachable ejector and chopping knives 46, 47 are distributed in a helical and quincuncial array. These knives are disposed alternately as follows: an ejector knife 46 and a chopping knife 47, in the space entirely covering the surface of the cone. The knives located along the line of least diameter of the cone, having therefore a relatively low linear speed, function only to chop the surface to be worked. They likewise attack the soil to a feeble depth only, yet complementing the simultaneous advance and speed of the rotary cutter. Those knives positioned on the cone in the form of a helix chop and eject the earth and gravel in a succession of small, bantam passes. Thus, these knives do not take on too large clumps of earth but with uniform strokes they upturn and rapidly excavate a depression or trench with relatively little effort.

The removed earth and gravel are thrown to the outside of the worked trench by the ejector knives 46, located along the greatest diameter of the cone and on sole 62, bringing thus to bear a maximum ejecting force.

Figure 12:
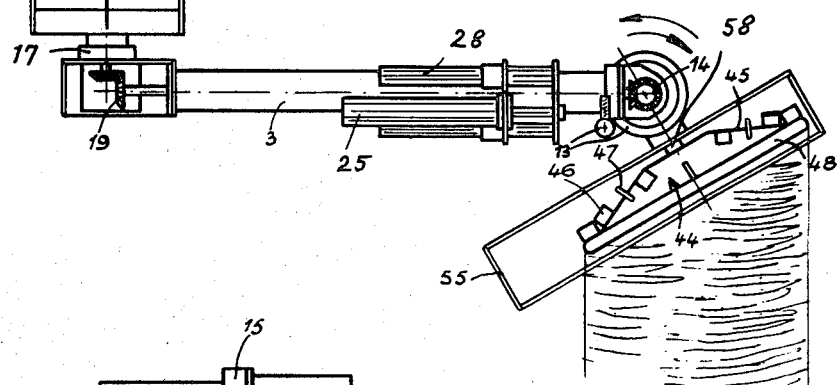
FIG. 12 is an exploded view of the transmission or gear head of the cutter connected to the supporting arm by way of a bearing.
Figure 12:
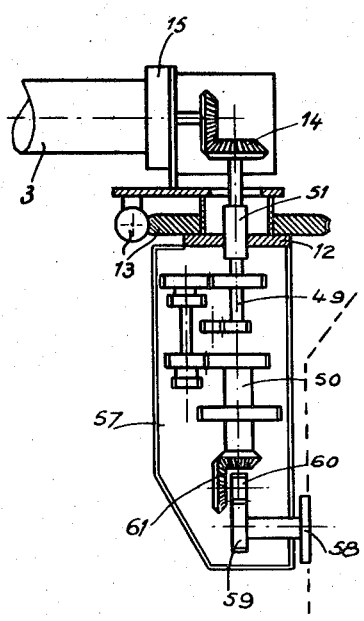
Figure 13:
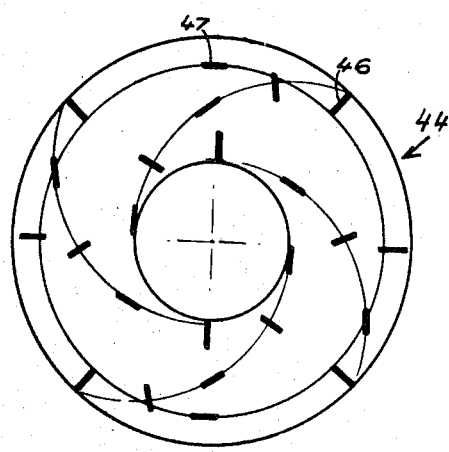
FIG. 13 is a plan view of the cutter shown in FIGS. 10 and 11.
Figure 14:
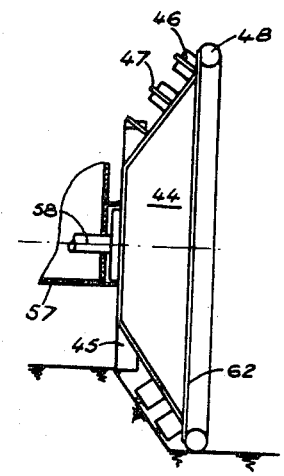
FIG. 14 is a side view of the cutter.

The earth and debris can be expelled either to the right or the left of the trench, depending on whether the cutter is turning in one sense or the other by the action of inverter 49 (FIG. 12).

The provision of two-speed transmission 57 permits the cutter indifferently to traverse a hard soil at a slow pace or a soft soil at a rapid one.

Figure 15:
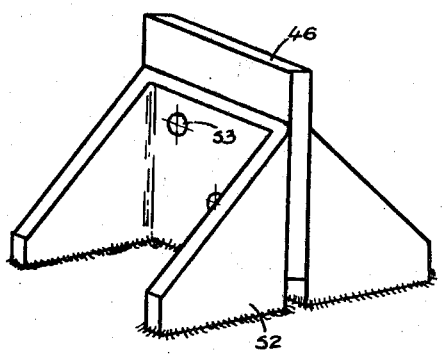
FIG. 15 shows an ejector knife and its support.
Figure 16:
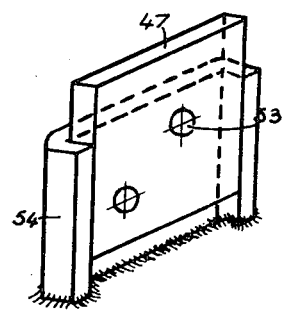
FIG. 16 shows a chopping knife and its support.

The ejector knives 46 may be fixed to supports 52 by bolts passed through bores 53 (FIG. 15). The chopping knives 47 have shoulder supports 54, their assembly is secured by bolts through bores 53 (FIG. 16).

A depth stop or limiter 48 serves to prevent the cutter 44 from getting stuck in the soil, by governing the stroke depth according to the character of the trench being worked. The wide operational range or extent policed by depth stop 48 serves to closely control the cutter and, since it turns at the same speed and diameter as said cutter, resistance to the motion of advance is not increased. Limiter 48, being in close juxtapostion to the knives (FIG. 14), enable them to engage the soil even if the knives are in digging action. Limiter 48 fulfills also a levelling and buffing function since it smooths the trench while turning in contact therewith.

A cover 55 (FIG. 10), enveloping the rotary cutter 44, and pivotable therewith, directs the expulsion of the material being evacuated or discharged.

It may be stated in closing that the elements specific to the inventive rotor-type cutter only are those numbered 44 to 62.

The foregoing disclosure relates only to preferred, exemplary embodiments of the invention, which is intended to cover and include all changes and modifications of the examples described within the scope of the invention as set forth in the appended claims.

What we claim is:

1. For use on a draft vehicle, in combination, a rotary cutter for digging trenches and the like when drawn, a supporting arm on said vehicle including means for driving said rotary cutter and means for releasable attachment of said cutter in operative relation to the outer end of said arm, the improvement wherein said cutter comprises a forwardly-directed, disc-type frustoconical working surface and a rear peripheral sole, a plurality of chopping knives and alternately disposed ejector knives attached to the frustoconical working surface and extending substantially normal thereto and in helical distribution for enabling a stepped-down operation requiring minimum power, drive means operatively connected to said cutter for rotating said cutter from a power drive of the vehicle, said frustoconical working surface terminating at a generally flat forward surface free from said knives, said forward surface being operatively connected to said drive means, said drive means extending radially from the center of said forward surface, at least one gear means forming part of said drive means, and mean for adjusting the position of said working surface of said rotary cutter relative to the vehicle and the soil in which said working surface is being drawn by said vehicle.

2. The rotary cutter as defined in claim 1 further comprising supports for said knives on said working surface, said supports including means for permitting replacement of said knives, certain of said ejector knives comprising substantially planar plates extending radially from the center of said working surface and being disposed adjacent the outer periphery of said working surface substantially at the sole thereof, and an annular depth gage abutting said rotary cutter rearwardly of said ejector knives, which limits the engagement in depth of said rotary cutter.

3. The rotary cutter as defined in claim 1, wherein said drive means includes two conical gear pairs each for providing a power input for said rotary cutter, said drive means extending radially from the center of said forward surface including a cheek shaft operatively connected to one of said gear pairs and defining the axis of rotation of said cutter.

* * * * *